(12) United States Patent
Best

(10) Patent No.: US 8,270,501 B2
(45) Date of Patent: Sep. 18, 2012

(54) CLOCKING ARCHITECTURES IN HIGH-SPEED SIGNALING SYSTEMS

(75) Inventor: Scott C. Best, Palo Alto, CA (US)

(73) Assignee: Rambus Inc., Sunnyvale, CA (US)

( * ) Notice: Subject to any disclaimer, the term of this patent is extended or adjusted under 35 U.S.C. 154(b) by 1089 days.

(21) Appl. No.: 10/921,576

(22) Filed: Aug. 18, 2004

(65) Prior Publication Data

US 2006/0039487 A1 Feb. 23, 2006

(51) Int. Cl.
*H04K 1/10* (2006.01)
*H04L 27/28* (2006.01)
(52) U.S. Cl. ........................................ 375/260
(58) Field of Classification Search .................. 375/260; 327/147, 163
See application file for complete search history.

(56) References Cited

U.S. PATENT DOCUMENTS

| | | | |
|---|---|---|---|
| 5,485,490 A | 1/1996 | Leung | |
| 6,178,213 B1 | 1/2001 | McCormack et al. | |
| 6,621,317 B2 * | 9/2003 | Saeki | 327/163 |
| 6,643,787 B1 | 11/2003 | Zerbe et al. | |
| 6,675,272 B2 | 1/2004 | Ware et al. | |
| 6,839,393 B1 | 1/2005 | Sidiropoulos | |
| 6,861,866 B2 * | 3/2005 | Han | 326/16 |
| 6,920,540 B2 | 7/2005 | Hampel et al. | |
| 7,099,424 B1 | 8/2006 | Chang et al. | |
| 7,292,629 B2 | 11/2007 | Zerbe et al. | |
| 7,484,064 B2 | 1/2009 | Ware et al. | |
| 2001/0026179 A1 * | 10/2001 | Saeki | 327/147 |
| 2002/0105386 A1 * | 8/2002 | Shastri | 331/11 |
| 2002/0114416 A1 * | 8/2002 | Enam et al. | 375/373 |
| 2002/0126540 A1 * | 9/2002 | Akiyoshi | 365/189.02 |
| 2003/0117864 A1 | 6/2003 | Hampel et al. | |
| 2004/0054482 A1 * | 3/2004 | Poechmueller | 702/57 |
| 2004/0119516 A1 * | 6/2004 | Kim | 327/158 |
| 2004/0264615 A1 | 12/2004 | Ho et al. | |
| 2004/0268190 A1 * | 12/2004 | Kossel et al. | 714/704 |

OTHER PUBLICATIONS

J. Sonntag, R. Leonowich; A Monolithic CMOS 10MHz DPLL for Burst-Mode Data Retiming; IEEE International Solid-State Circuits Conference; Feb. 16, 1990; pp. 194-195, 294; IEEE; US.
P. Larsson; A 2-1600-MHz CMOS Clock Recovery PLL with Low-Vdd Capability; IEEE Journal of Solid-State Circuits; vol. 34, No. 12, Dec. 1999; pp. 1951-1960; IEEE; US.

* cited by examiner

*Primary Examiner* — David C. Payne
*Assistant Examiner* — Tanmay Shah
(74) *Attorney, Agent, or Firm* — Mahamedi Paradice Kreisman LLP; Lance M. Kreisman

(57) ABSTRACT

Clocking systems and methods are provided below that accurately clock per-pin data transfers of input/output (IO) circuits of integrated circuit devices. These multiplexer-based clock selection systems use a dedicated multiplexer to receive clock signals from multiple mixer circuits and in turn to provide a selected reference clock signal for use by an interface circuit in transferring data to other integrated circuit devices. The timing of the selected reference clock signal is synchronized with the data signals to provide optimal sampling of the data signals. The multiplexer-based clock selection system is for use in memory interfaces of high-speed signaling systems for example.

29 Claims, 9 Drawing Sheets

CLOCKING ARCHITECTURES IN HIGH-SPEED SIGNALING SYSTEMS

TECHNICAL FIELD

The disclosure herein relates generally to signal transfers in signaling systems. In particular, this disclosure relates to clocking architectures in high-speed signaling systems.

BACKGROUND

High-speed processor-based systems have become commonplace in computing, communications, and consumer electronic applications to name a few. The processors in these high-speed systems, which are typically multi-gigahertz processors, continue to place higher demands on the associated subsystems. The transfer of information and signals required among the subsystems of these high-speed systems has led to increasing demands for integrated circuit interfaces that support the efficient high-speed transfer of information. Examples of such interfaces include the interfaces between processors and memory devices.

In chip-to-chip topologies, the time of flight of an electrical signal on an electrical interconnect can be an appreciably large portion of the overall bit-time, or period, of that electrical signal. In systems such as double data rate synchronous memory systems, a number of bits are treated as a collective group (i.e., referred to as a "byte", for example 8 bits), and many bytes may be communicated in parallel between a memory controller and memory devices. Typically the data being transmitted between devices will be synchronous to some "transmit clock" that is common to each bit in the byte. Similarly, data sampling will be done using a "receive clock" that is typically common to each bit in the byte. However, due to the "per-byte clocking" nature of such systems, the maximum transfer rate capability of such a multi-byte interface will be limited by the pin-to-pin timing offsets created by variations in the time of flights of the individual electrical interconnects, as well as other factors. Consequently, there is a need for electronic circuits which provide the interface circuits of these interfaces with transmit and receive clocks that are optimized on a per-pin basis.

BRIEF DESCRIPTION OF THE DRAWINGS

In the drawings, the same reference numbers identify identical or substantially similar elements or acts. To easily identify the discussion of any particular element or act, the most significant digit or digits in a reference number refer to the Figure number in which that element is first introduced (e.g., element 100 is first introduced and discussed with respect to FIG. 1).

DETAILED DESCRIPTION

Figure 1:
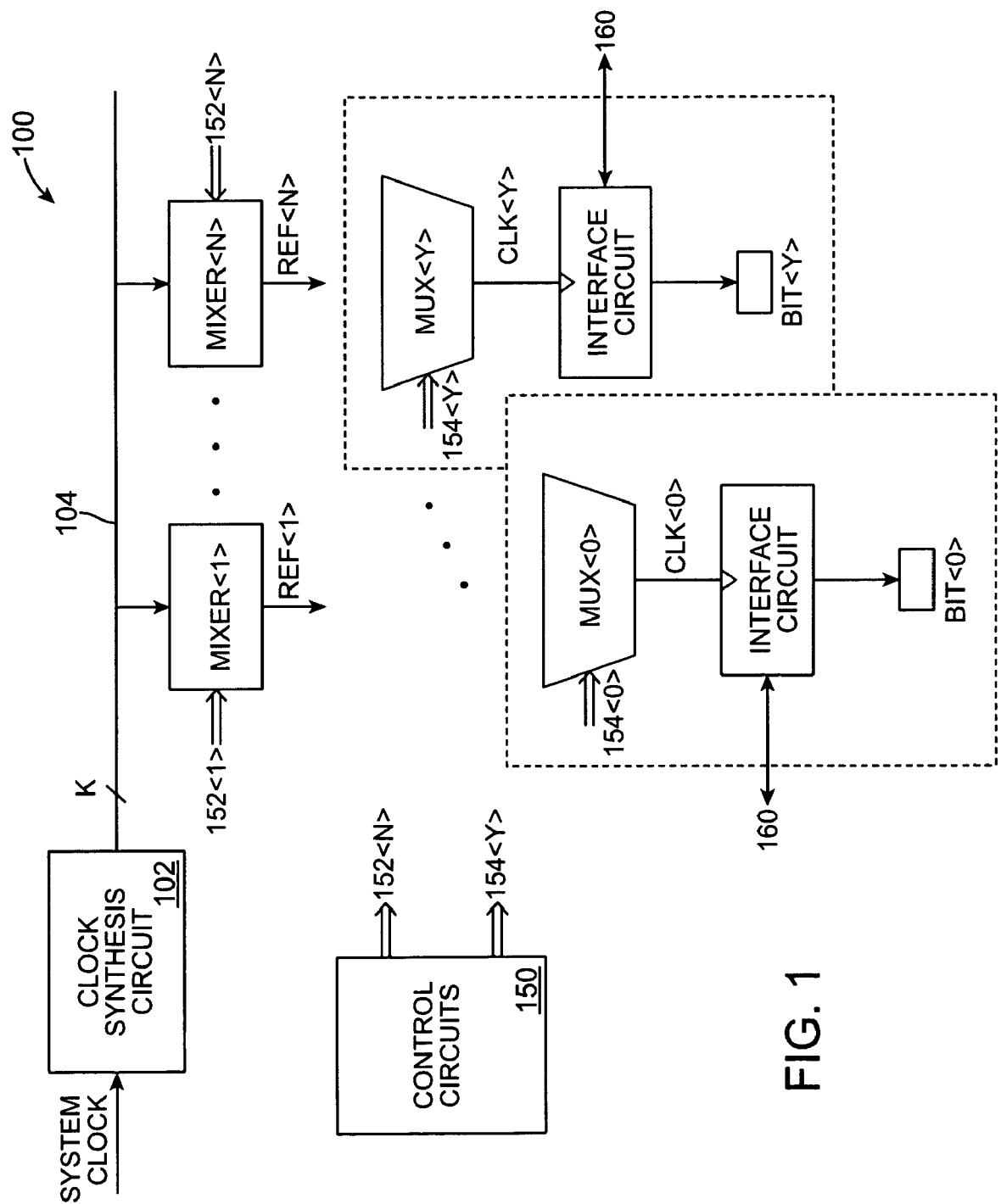
FIG. 1 is a block diagram of a multiplexer-based clock selection system, under an embodiment.

Clocking circuits and methods are described below that can provide accurate per-pin clocks for interface circuitry used in electrical interfaces of integrated circuit devices. These circuits and the corresponding methods, alternatively referred to herein as multiplexer-based clock selection systems and clock selection systems, use a multiplexer to receive clock signals from multiple clock sources, such as mixer circuits, and in turn provide an optimal clock signal for use by an interface circuit (e.g., such as a transmitter circuit, or a data-sampling circuit) in transferring data via a coupled electrical interconnect. The selection of a clock signal for an interface circuit of a given pin can be managed with respect to the data signals of the corresponding pin to provide either optimal sampling or optimal transmission of the data signals. Consequently, under the multiplexer-based clock selection systems and methods provided below, each pin interface includes a dedicated multiplexer to provide either receive and/or transmit clock signals having optimized timing relative to data signals of the corresponding pin's electrical interface.

The multiplexer-based clock selection system is a circuit that is generally coupled to an interface circuit which utilizes a clock provided by a dedicated multiplexer (e.g., an N-to-1 multiplexer). The interface circuit controls data transfers to/from a pin of a high-speed electrical interface. The N-to-1 multiplexer receives as inputs, a number "N" of reference clock signals of the same frequency but differing phases from multiple sources such as mixer circuits. The multiplexer selects one of the "N" reference clock signals, under control of one or more control circuits or controllers, and outputs the selected clock signal to the clock input of the interface circuit. The control circuit optionally controls the multiplexer to select and output the selected clock signal based on a response to an automatic comparison of each of the "N" reference clock signals and data signals of the interface circuitry associated with a pin to which the multiplexer is dedicated.

In the following description, the term "interface circuit" is used to refer to the electronics of an integrated circuit that is coupled to one or more pins of the device and is used to effectuate communications with other integrated circuit devices. An interface circuit can include a single receiver circuit or a single transmitter circuit coupled to a pin, or both a receiver and transmitter circuit (e.g., a transceiver) coupled to that pin. Interface circuitry may also share circuitry that is used for communications via a plurality of pins. Other circuitry may be included in the interface circuit, for example, pipeline stages, or on-chip termination (e.g., a resistive, capacitive or inductive element).

In the following description, numerous specific details are introduced to provide a thorough understanding of, and enabling description for, embodiments of the multiplexer-based clock selection system. One skilled in the relevant art, however, will recognize that these embodiments can be practiced without one or more of the specific details, or with other circuits, components, systems, etc. In other instances, well-known structures or operations are not shown, or are not described in detail, to avoid obscuring aspects of the disclosed embodiments.

FIG. 1 is a block diagram of a multiplexer-based clock selection system 100, under an embodiment. The clock selection system 100 is a component of and/or coupled to a host system or subsystem (not shown) as appropriate to the host system/subsystem but is not so limited. The clock selection system 100 includes a clock synthesis circuit 102 that receives a system clock (of the host system/subsystem) at an input and provides multiple internal clock signals 104 at one or more outputs. The internal clock signals 104 include a number "K" of clock signals each of which has a different phase relationship to the system clock, but the embodiment is not so limited. The internal clock signals 104 are each coupled to the inputs of a number "M" of mixer circuits MIXER<N>, where N is 1, 2, . . . M. Each of the mixer circuits MIXER<N> is controlled by mixer control signals 1 52<N> to each provide a reference clock signal REF<N> as an output, as described in detail below. The mixer control signals 1 52<N> are provided by control circuits 150 of the clock selection system, but alternative embodiments can provide the mixer control signals 1 52<N> by any number/combination of other components of the clock selection system 100 and/or the host system/subsystem.

The clock selection system 100 further includes a number "X" of N-to-1 multiplexers MUX<Y>, where Y is 0, 1, . . . X. In an embodiment, one multiplexer MUX<Y> is dedicated to each clock input of each interface circuit that further couples to BIT<Y>, the electrical interface pin, but the embodiment is not so limited. Each multiplexer MUX<Y> receives as inputs all reference clock signals REF<N> from the mixer circuits MIXER<N> and selects one of these input reference clock signals for output to the coupled interface circuit.

Each multiplexer MUX<Y> operates to select an output reference clock signal under control of one or more control circuits 150 via multiplexer control signals 154<Y>. The control signals 154<Y> control each multiplexer MUX<Y> to select and output the selected reference clock signal CLK<Y>. Optionally, the selection of an output clock signal CLK<Y> is managed by an automatic process that acts in response to relative timing information of all reference clock signals REF<N> and data signals of the electrical interface pin BIT<Y> to which the multiplexer MUX<Y> is coupled, as described in detail below. The multiplexer control signals 154<Y> are provided by control circuits 150 of the clock selection system, but alternative embodiments can provide the multiplexer control signals 154<Y> by any number/combination of other components of the clock selection system 100 and/or the host system/subsystem.

Figure 2:
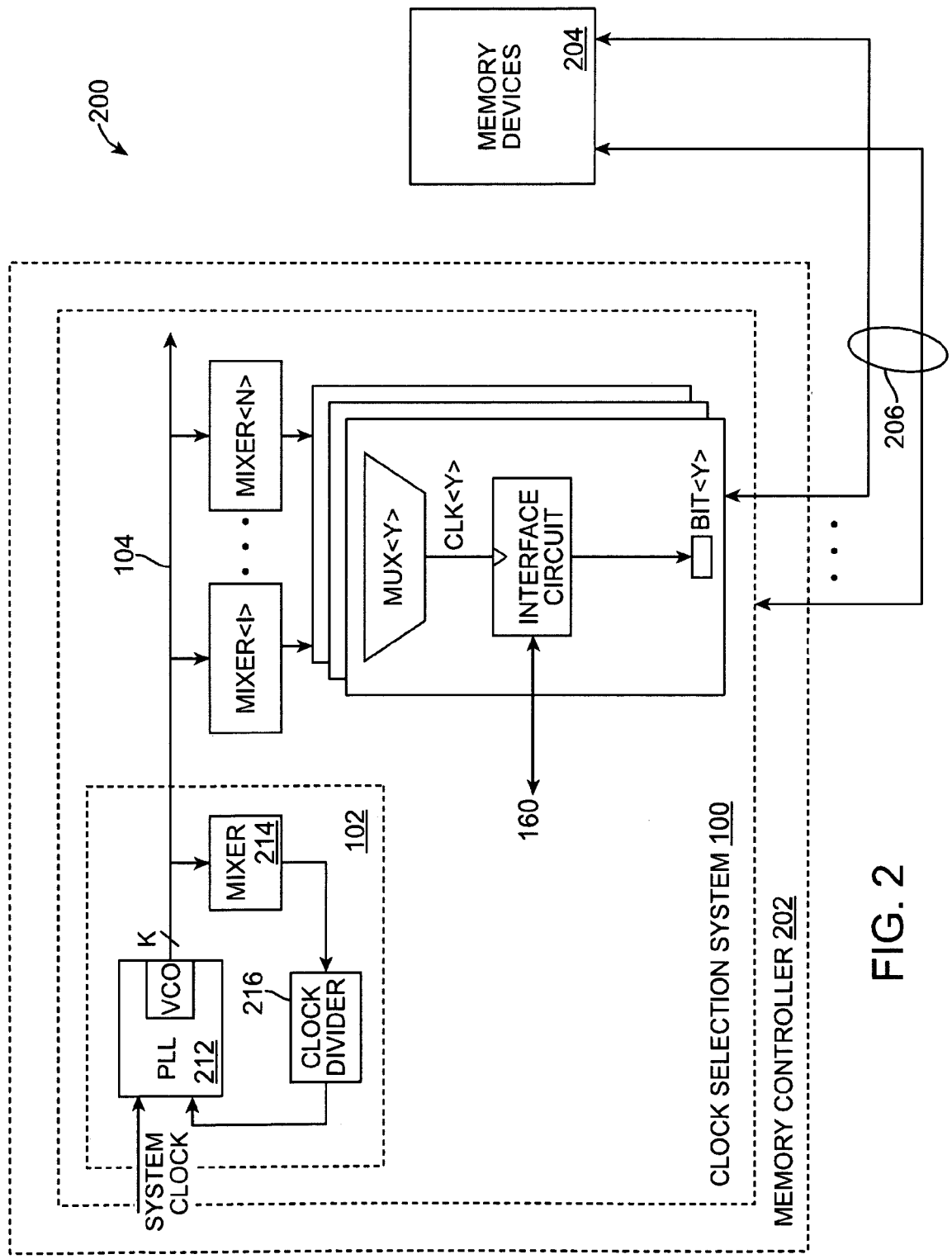
FIG. 2 is a block diagram of a memory subsystem that includes the multiplexer-based clock selection system as a component, under an embodiment.

As an example of a host system of which the clock selection system is a component, FIG. 2 is a block diagram of a synchronous memory subsystem 200 that includes the multiplexer-based clock selection system 100 as a component of the memory controller, under an embodiment. The synchronous memory subsystem 200 includes a memory controller 202 that interfaces with one or more memory devices 204 using the clock selection system 100 and electrical interconnect 206. The clock selection system 100 includes a clock synthesis circuit 102 coupled to receive a system clock of the synchronous memory subsystem 200 at an input. An embodiment of a clock synthesis circuit 102 includes a phase-locked loop (PLL) 212 with a multi-phase output voltage-controlled oscillators (VCO), a mixer 214 to generate a feedback clock, and a clock divider 216. In this embodiment, clock synthesis circuit 102 generates multiple internal clock signals 104 which are a frequency multiple of the received system clock signal. The internal clock signals 104 include a number "K" of clock signals, each of which has a different phase relationship to the system clock, but the embodiment is not so limited.

As an example, the phases of each of the K clock signals are evenly distributed across one transmission period or cycle of a sample clock, but the embodiment is not so limited.

An alternative embodiment of the clock synthesis circuit 102 can include a delay-locked loop (DLL). The DLL uses a delay-line to generate the internal clock signals (104), but is not so limited.

The clock selection system 100 also includes one or more interface circuits each of which couples to multiple mixer circuits, MIXER<N>, via dedicated N-to-1 multiplexer circuits, MUX<Y>, as described above with reference to FIG. 1. The mixer circuits MIXER<N> are each coupled to receive the "K" internal clock signals 104 as inputs and in response to each provide a reference clock signal REF<N> as an output. As one example, the clock selection system of an embodiment includes eight (8) mixers that have their inputs coupled to four (4) internal clock signals, but the embodiment is not so limited. Each of the mixer circuits MIXER<N> thus outputs a reference clock signal REF<N> (where N is 1, 2, . . . 8) that is coupled to one input of each of a number of multiplexers MUX<Y>. In operation, generally, the clock selection system of an embodiment selects a reference clock signal for use by an input/output sub-system in controlling the transfer of data signals over an electrical interface. As such, the selected reference clock signal can be chosen so as to optimize performance of either the receiver or transmitter associated with that electrical interface during data transfer operations.

Figure 3:
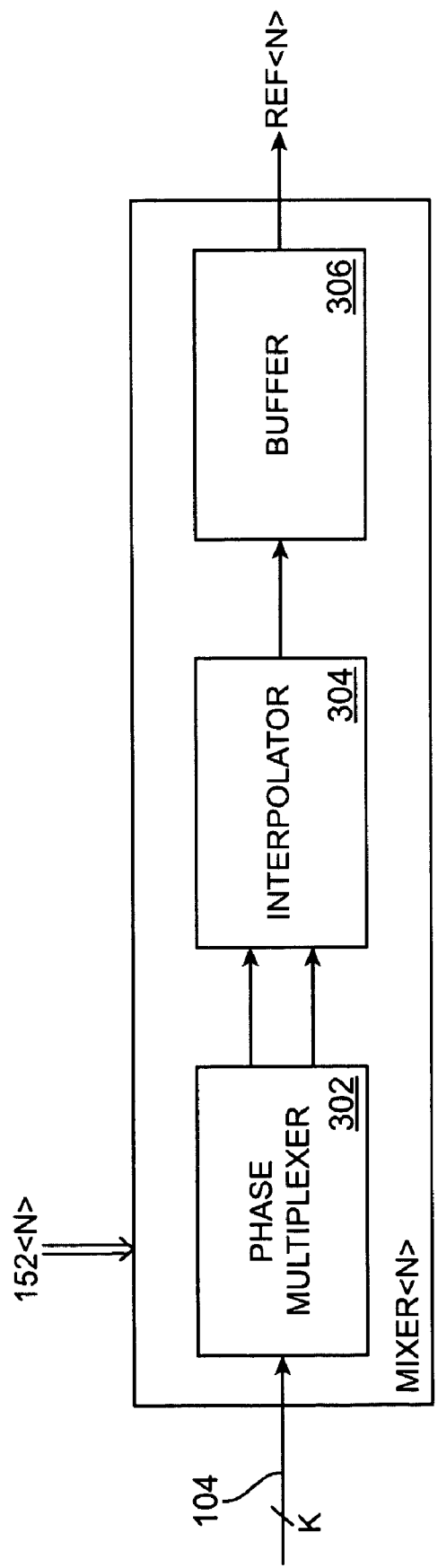
FIG. 3 is a block diagram of a mixer circuit of the clock selection system, under an embodiment.

FIG. 3 is a block diagram of a mixer circuit of the clock selection system, under an embodiment. The mixer circuit MIXER<N> generally includes a phase multiplexer 302, an interpolator 304, and a buffer 306, which can optionally perform additional processing tasks such as level-translation or duty-cycle correction. The phase multiplexer 302 receives the "K" internal clock signals 104 at one or more inputs, as described above with reference to FIG. 1. The internal clock signals 104 include multiple clock signals of the same frequency but different phases. The phase multiplexer 302 selects and outputs as many as two of the internal clock signals in accordance with information of the mixer control signals 152. The interpolator 304 couples to receive the output signals from the phase multiplexer 302 and outputs a clock signal in accordance with information of the mixer control signals 152, for example. The buffer 306 couples to receive the output signal from the interpolator 304 and, after applying any additional optional processing (such as level translation and/or duty-cycle correction), outputs the reference clock signal REF<N>.

Figure 4:
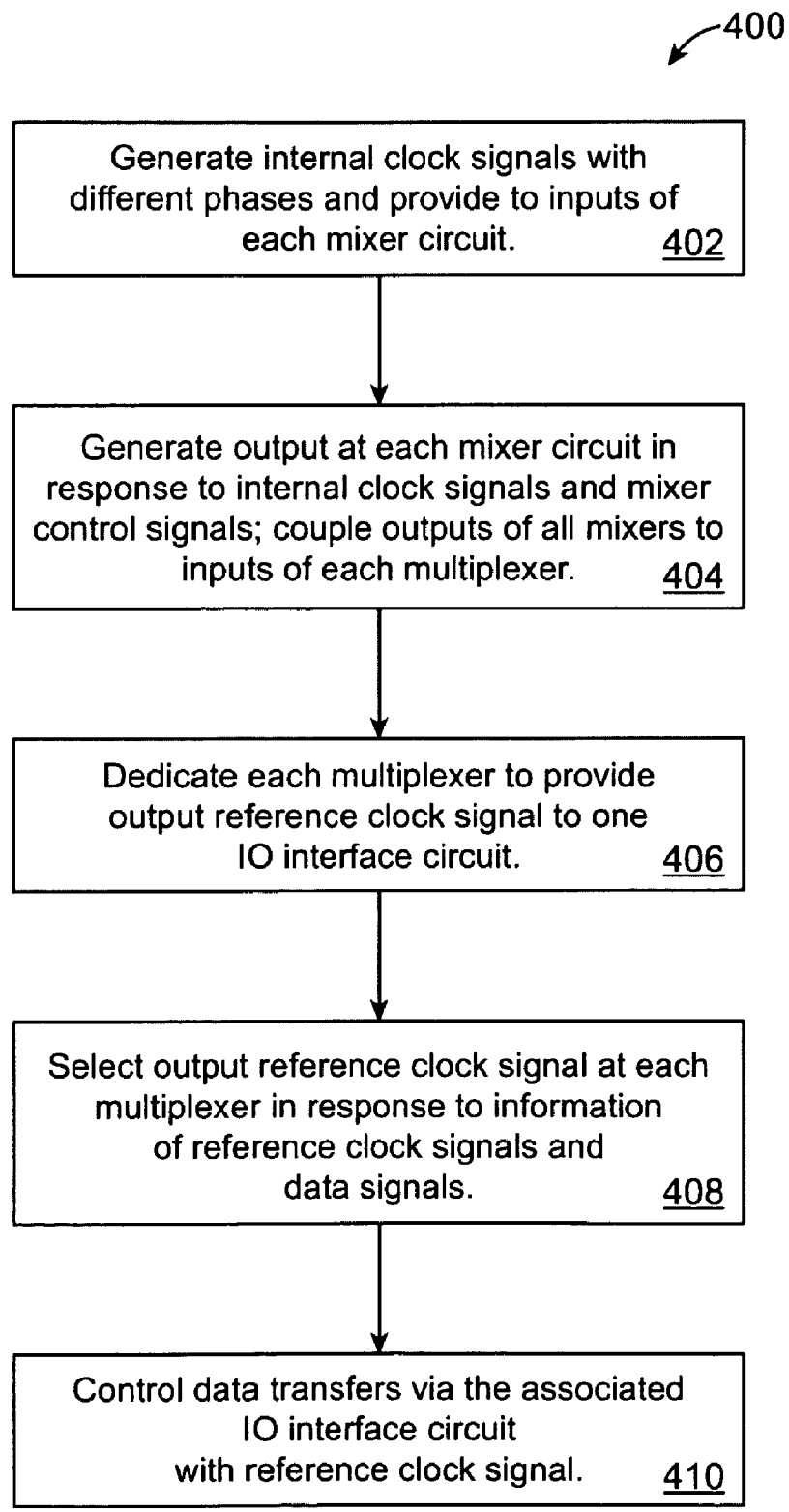
FIG. 4 is a flow diagram for selection of an optimal reference clock signal, under an embodiment.

FIG. 4 is a flow diagram 400 for selection of an optimal reference clock signal, under an embodiment. A number "K" of internal clock signals are generated from a received system clock, at block 402, and each of the internal clock signals has a different phase relative to the system clock signal. As an example, the different phases of the internal clock signals collectively span one cycle or period of the corresponding data signals with the phases evenly spaced through the cycle. As another example, the different phases of the internal clock signals collectively span one cycle or period of the corresponding data signals with the phases evenly spaced through a portion or segment of the cycle. The "K" internal clock signals upon/following generation are collectively applied to the inputs of a number "M" of mixer circuits.

Upon receipt of the "K" internal clock signals, each of the "M" mixer circuits generates an output in response to at least two of the internal clock signals as well as the mixer control signals and provides the output to a number "X" of multiplexers, at block 404. The multiplexers are each dedicated to an interface circuit of a particular pin/electrical interface so that a clock signal output of each multiplexer is coupled to control data transfers via the pin and associated electrical interface to which the pin is coupled, at block 406. Each multiplexer is configured to select one of the "M" internal clock signals at its input, coupling that selected input to become a reference clock output which in turn couples to the interface circuit, at block 408. The reference clock output is selected at each multiplexer, at block 408, based on values written and/or programmed into registers in response to relative timing information of the reference clock signals and data signals, as described herein. The reference clock signal output controls data transfers via the associated interface circuit's electrical-interface, at block 410, where the data transfers include sampling and/or transmitting data signals via the pin.

Selection of one of the "M" internal clock signals for output as a reference clock signal from each multiplexer is made via multiplexer control signals from one or more control circuits, as described above. The control circuits of one or more embodiments include one or more programmable registers. The content of the programmable registers, which control selection of an internal clock signal as a MUX output, is determined in accordance with several approaches, including both automatic and user-programmable processes. In one embodiment the content of the programmable registers is determined using information of a calibration process and automatically programmed into the registers of the control circuits. Generally, a calibration processes can evaluate and compare the relative timing information of each of the reference clock signals relative to data signals of the associated pin and in so doing determine which of the reference clock signals is optimal for use in sampling and/or transmitting data signals via the pin. Alternatively, the content of the programmable registers is manually programmed into the registers of the control circuits by a user.

Similar to selection of an internal clock signal for output as a reference clock signal from each multiplexer, each mixer circuit is controlled by mixer control signals to provide a reference clock signal as an output. The control circuits select a reference clock signal as an output of a mixer in accordance with several approaches, including automatic processes and programmable processes (using registers that are user-programmable and/or automatically programmable), similar to those described above with reference to the multiplexer control signals.

Figure 5:
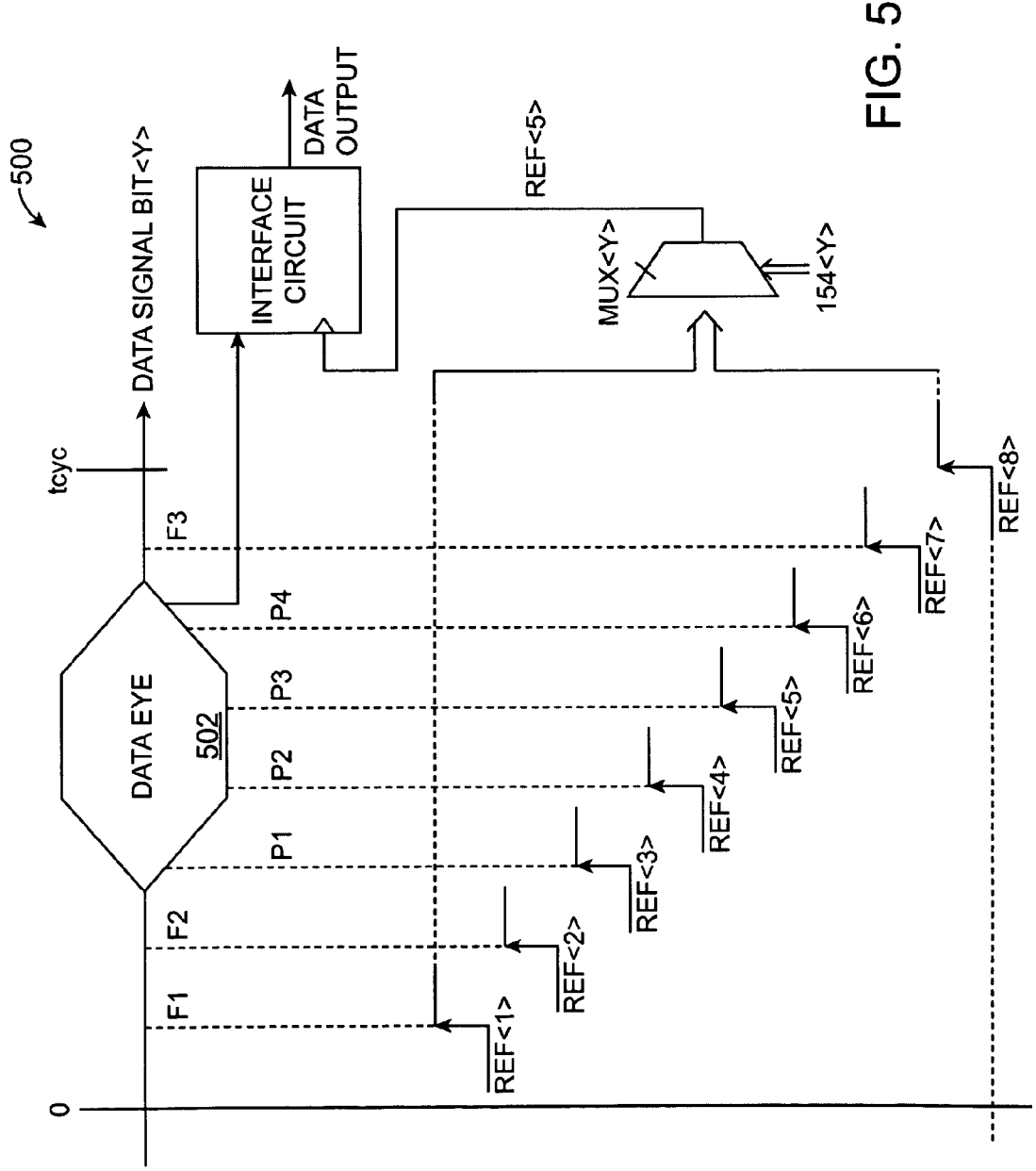
FIG. 5 is a signal timing diagram for selection of a reference clock signal using an example clock selection system, under an embodiment.

FIG. 5 is a signal timing diagram 500 illustrating a process which performs automatic selection of a reference clock signal using an example clock selection system, under an embodiment. The clock selection system used for purposes of this example is configured as described above with reference to FIG. 1 and includes eight (8) (M is 8) mixer circuits (not shown), but is not so limited. Consequently, each of the eight mixer circuits outputs a reference clock signal REF<N> (where N is 1, 2, ... 8) having one of eight different phases. The different phases of the reference clock signals REF<N> collectively span one cycle or period $t_{cyc}$ of the corresponding data signals with the phases evenly spaced through the cycle $t_{cyc}$ but, as described above, the embodiment is not so limited.

Taking one interface circuit as an example, a memory controller or other component of a host system places one or more components of the clock selection system in a calibration mode. In the calibration mode, a known data pattern 502 is provided to the interface circuit via an external signal which carries a data signal BIT<Y> (from a memory device for example) and the host system in turn initiates dummy reads from a memory device. During the dummy reads, the data signals BIT<Y> are sampled by the interface circuit using a clock provided by an 8-to-1 multiplexer MUX<Y> whose eight inputs are each coupled to one of the eight reference clock signals REF<N>. A comparison is made of the sampled data corresponding to each particular reference clock signal REF<N> and the known data pattern 502 and a pass/fail determination is made using information of the comparison.

A pass condition (P) is indicated when a sample point is in the data eye 502 (i.e., a data-sample within this region will result in a received data pattern that matches the predetermined data pattern), and a fail condition (F) is indicated when a sample point is outside the data eye 502 of the data signal. As an example, sampled data corresponding to sampling of the data signal using reference clock signal REF<1> results in a fail condition because the sample point on the data signal is outside the data eye 502; however, sampled data corresponding to sampling of the data signal using reference clock signal REF<3> results in a pass condition because the sample point on the data signal is in the data eye 502. Using the pass/fail information, a size of the pass region is determined by comparing the value "N" between the first pass condition ("P1" which corresponds to REF<3> in this example) and the last pass condition ("P4" which corresponds to REF<6> in this example). In one embodiment, a numerical average of the first and last pass condition "N" values is performed, yielding an average of 4.5, which is then rounded up to the nearest integer value. Via this example process, reference clock signal REF<5> is chosen as the output of the 8-to-1 multiplexer MUX<Y> during normal operations.

As described above, the clock selection system of an alternative embodiment can control the different phases of the reference clock signals to collectively span one cycle or period of the corresponding data signals with the phases evenly spaced through a portion or segment of the cycle instead of through the entire cycle. As an example, a host system configuration might result in data transfers in which the data eye is always present in the later half of cycle $t_{cyc}$. As a result, the reference clock spacing can be changed so that the reference clock signal phases are evenly spaced through the second half of the cycle $t_{cyc}$.

Figure 6:
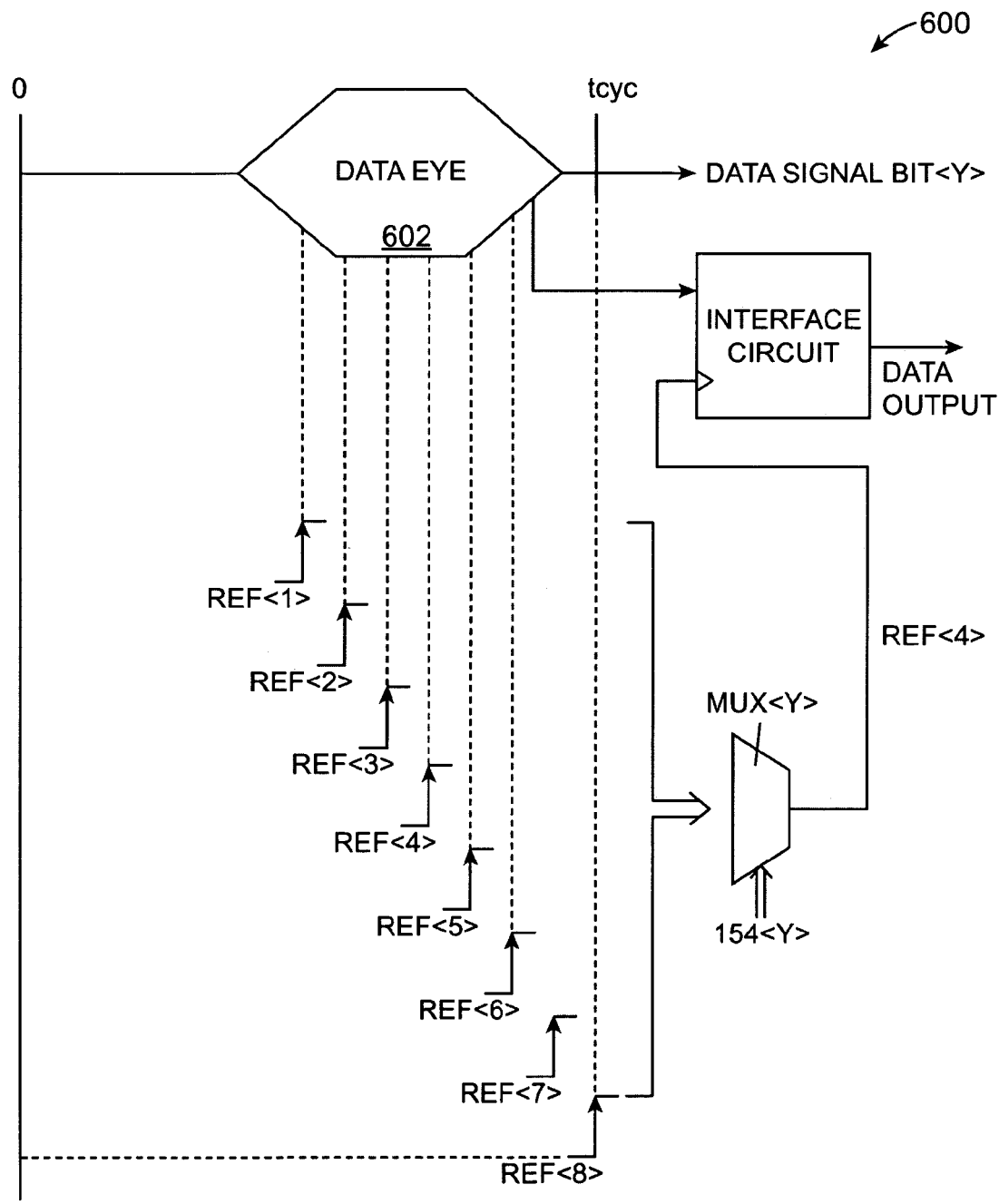
FIG. 6 is a signal timing diagram for selection of a reference clock signal using an example clock selection system, under an alternative embodiment.

FIG. 6 is a signal timing diagram 600 for selection of a reference clock signal using an example clock selection system, under an embodiment. The clock selection system used for purposes of this example includes eight (8) (M=8) mixer circuits (not shown), but is not so limited. Consequently, each of the eight mixer circuits outputs a reference clock signal REF<N> (where N is 1, 2, ... 8) having one of eight different phases. The different phases of the reference clock signals REF<N> collectively span the second half of each cycle or period $t_{cyc}$ of the corresponding data signals with the phases evenly spaced through the second half of cycle $t_{cyc}$.

Taking one interface circuit as an example, a memory controller, an application specific integrated circuit ("ASIC"), an integrated circuit that controls the operation of a memory device, or other component of a host system places one or more components of the clock selection system in a calibration mode. In the calibration mode a known data pattern 602 is provided to the interface circuit pin via an external signal line which carries data signal BIT<Y> (from a memory device for example) and the interface circuit in turn initiates dummy reads of the data signals. During the dummy reads, the data signals are sampled by the interface circuit using each of the eight reference clock signals REF<N>. A comparison is made of the sampled data corresponding to each particular reference clock signal REF<N> and the known data pattern 602 and a pass/fail determination is made depending on whether each sample point is in the data eye 602 or outside the data eye 602 of the data signal. Using the pass/fail information, a size of the pass region is determined by comparing the value "N" between the first pass condition ("P1" which corresponds to REF<1> in this example) and the last pass condition ("P6" which corresponds to REF<6> in this example). In one embodiment, a numerical average of the first and last pass condition "N" values is performed, yielding an average of 3.5, which is then rounded up to the nearest integer value. Via this example process, reference clock signal REF<4> is chosen as the output of the 8-to-1 multiplexer MUX<Y> during normal operations.

Following determination of the optimal reference clock signal the memory system is placed in an operating mode in which the interface circuit functions as one of an input sampler and a transmit driver. The reference clock signal selected during the calibration process (REF<4> in the example above) is subsequently used as a clock input CLK<Y> for the interface circuit in data transfers via the associated pin. Use of the selected reference clock signal optimizes the overall timing margin between the data signal and the per-bit sample signal during data transfer operations. Thus, when system configuration consistently places the data eye 602 in a particular portion of the cycle $t_{cyc}$, finer granularity can be achieved by focusing the phase range of the reference clock signals in this same portion of the cycle.

Use of dedicated multiplexers for per-bit clock selection can produce circuit topologies having reduced circuit area, system calibration time and/or power consumed by the clock selection system, in relation to an approach that uses a dedicated mixer for every I/O path. The reduction in system calibration time can be realized through the use of a smaller number of mixers and a smaller number of reference clock signal phases.

This reduction in system calibration time is provided in response to an observation that, given N phases of a clock running at $t_{cyc}$, where the maximum data eye is of duration $t_{cyc}/2$ (i.e., double data rate clocking), and given the ability to multiplexer-select any one of these clock phases for use in clocking the input samplers for example, then the maximum sample-timing offset from any given ideal sampling point within that data eye is $t_{cyc}/(2*N)$ (i.e., half the distance between any two clock edges). This sample-timing offset provides adequate granularity in reference clock signal adjustments while allowing for significant reductions in the number of circuits (circuit area, power consumed) included in the clock selection system.

More specifically, given the example system described above with reference to FIG. 5, when using reference clock signals of frequency 1.6 GHz (frequency=$1/t_{cyc}$=1.6 GHz), a typical valid data eye lasts approximately 200 picoseconds in duration. Given the disclosed clock-selection system with eight mixers (M=8), the maximum sample-timing offset of an input sampler in the interface circuit is approximately 40 picoseconds ($t_{cyc}/(16)$). Thus, the data eye size is easily long enough to absorb error in data-eye position with this smaller number of mixers.

Figure 7:
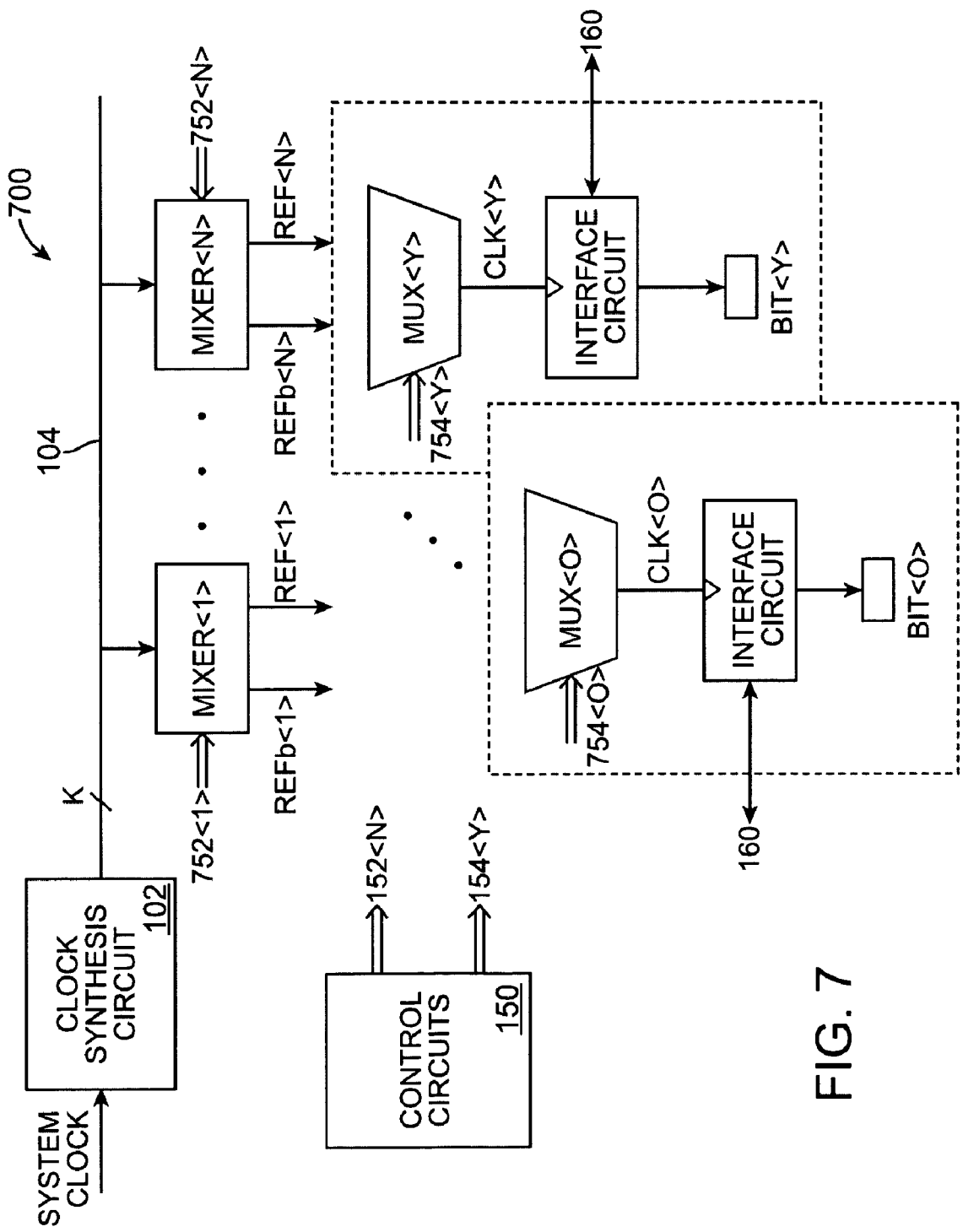
FIG. 7 is a block diagram of a multiplexer-based clock selection system, under an alternative embodiment.

The clock selection system of alternative embodiments provides an increase in granularity of clock selection through the additional use of logical complements (e.g., CLK and CLKb) of the reference clock signals. FIG. 7 is a block diagram of a multiplexer-based clock selection system 700, under an alternative embodiment. The clock selection system 700 includes a clock synthesis circuit 102 that receives a system clock (of the host system/subsystem) at an input and provides multiple internal clock signals 104 at one or more outputs. The internal clock signals 104 include a number of clock signals K each of which have a different phase relationship to the system clock, but the embodiment is not so limited. The internal clock signals 104 are each coupled to the inputs of a number of mixer circuits MIXER<N>, where N is 1, 2, . . . M. The mixer circuits MIXER<N> are controlled by mixer control signals 752<N> to each provide a reference clock signal REF<N> and a complement reference clock signal REFb<N> as outputs. Thus the "M" Mixer circuits produce a total of "2*M" reference clock signals. The mixer control signals 752<N> are provided by control circuits 150 of the clock selection system, but alternative embodiments can provide the mixer control signals 752<N> by any number/combination of other components of the clock selection system 700 and/or the host system/subsystem.

The clock selection system 700 further includes a number "X" of "2*M-to-1" multiplexers MUX<Y> (where Y is 0, 1, . . . X). In an embodiment one multiplexer MUX<Y> is dedicated to each pin of an interface circuit and thus the data signal BIT<Y> coupled to the pin, but the embodiment is not so limited. Each multiplexer MUX<Y> receives as inputs all reference clock signals REF<N> and complement reference clock signals REFb<N> from the mixer circuits MIXER<N> and selects one of these input reference clock signals for output to the coupled interface circuit as an output reference clock signal CLK<Y>.

Each multiplexer MUX<Y> operates to select an output reference clock signal CLK<Y> under control of one or more control circuits 150 via multiplexer control signals 754<Y>. The control signals 754<Y> control each multiplexer MUX<Y> to select and output the selected reference clock signal CLK<Y>. Selection of a "2*M" internal clock signal as a given MUX's output can be made via an automatic process that acts in response to a comparison of timing information of each of the reference clock signals relative to data signals of the associated interface circuit. The multiplexer control signals 754<Y> are provided by control circuits 150 of the clock selection system, but alternative embodiments can provide the multiplexer control signals 754<Y> by any number/combination of other components of the clock selection system 700 and/or the host system/subsystem.

Each multiplexer MUX<Y> provides the selected reference clock signal CLK<Y> as an output to a clock input of the interface circuit to which that multiplexer MUX<Y> is dedicated. The interface circuit couples to transfer data to/from a number of pins/electrical interfaces BIT<Y> and one or more signal lines 160 under control of the selected reference clock signal CLK<Y>.

Figure 8:
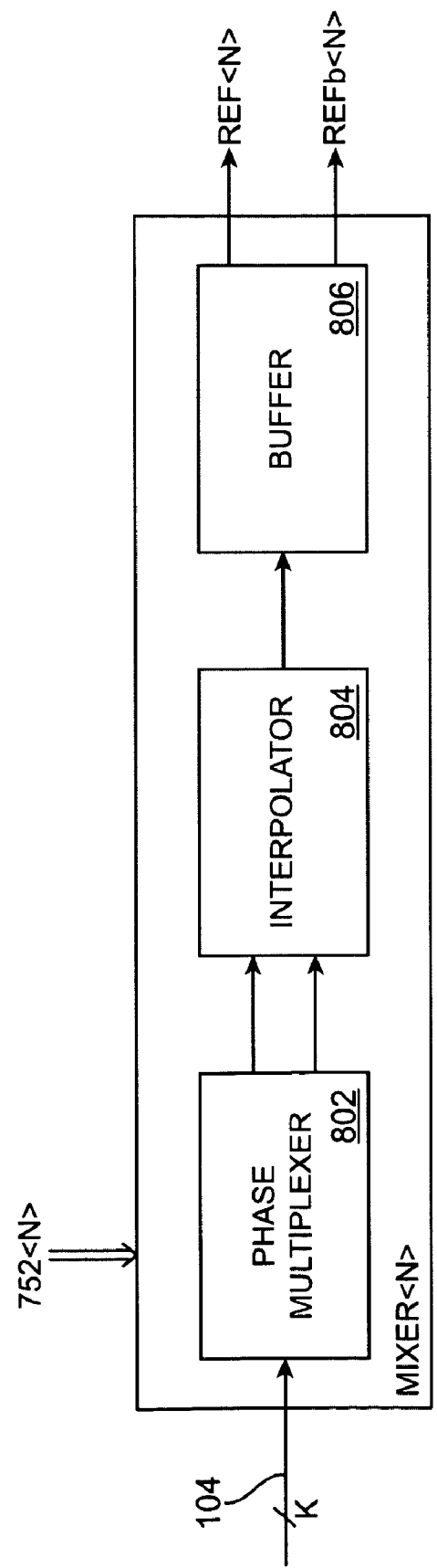
FIG. 8 is a block diagram of a mixer circuit of the clock selection system, under an alternative embodiment.

FIG. 8 is a block diagram of a mixer circuit of the clock selection system, under an alternative embodiment. The mixer circuit MIXER<N> generally includes a phase multiplexer 802, an interpolator 804, and a buffer 806, which can optionally perform additional processing tasks such as level-translation or duty-cycle correction. The phase multiplexer 802 receives the "K" internal clock signals 104 at one or more inputs, as described above with reference to FIG. 1. The internal clock signals 104 include multiple clock signals of the same frequency but different phases. The phase multiplexer 802 selects and outputs as many as two of the internal clock signals in accordance with information of the mixer control signals 752<N>. The interpolator 804 couples to receive the output signals from the phase multiplexer 802 and outputs a clock signal in accordance with information of the mixer control signals 752<N>, for example. The buffer 806 couples to receive the output signal from the interpolator 804 and, after applying any additional optional processing such as level-translation and/or duty cycle correction, outputs a reference clock signal REF<N> and its logical complement signal REFb<N>.

Figure 9:
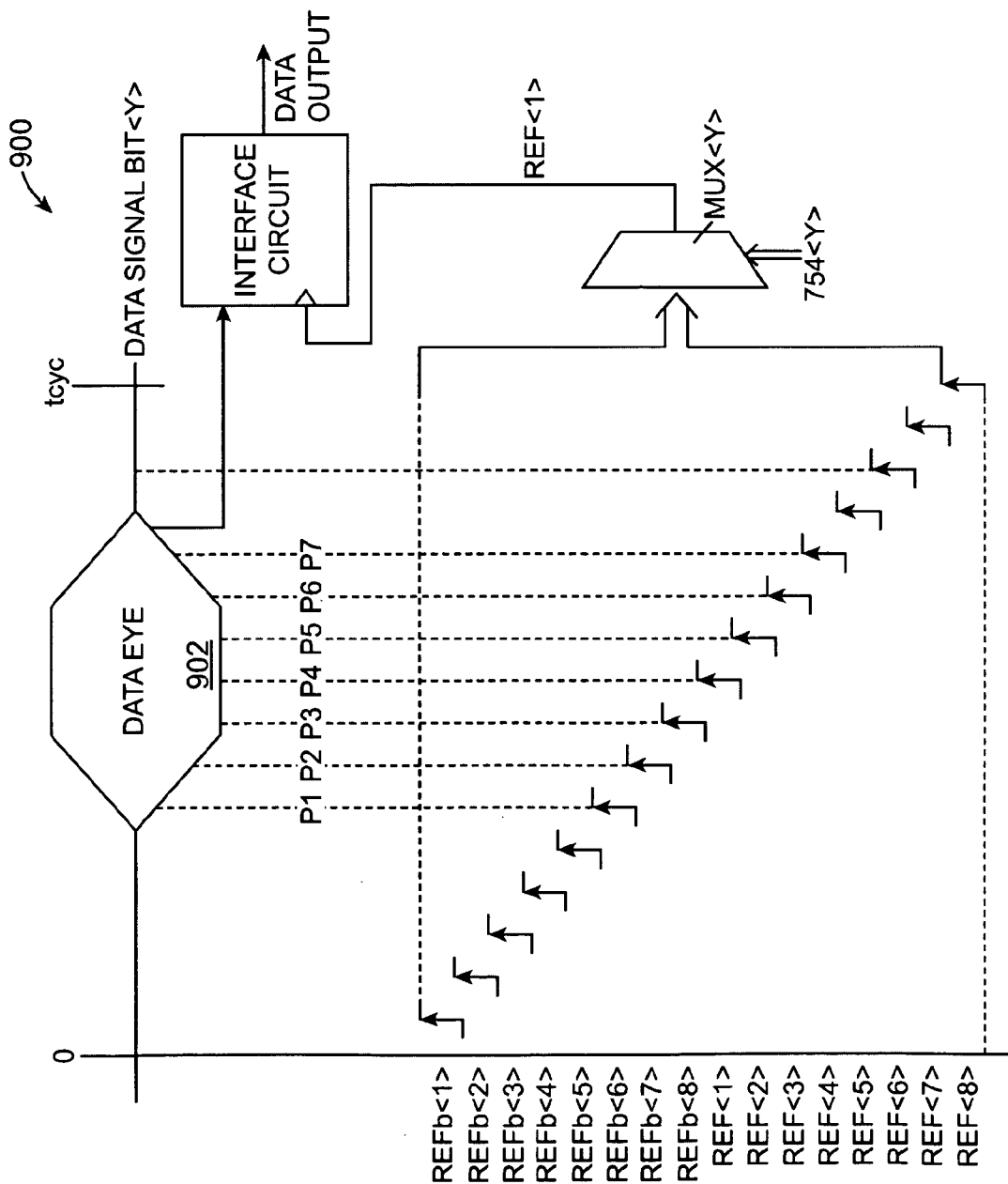
FIG. 9 is a signal timing diagram for selection of a reference clock signal using an example clock selection system, under another alternative embodiment.

FIG. 9 is a signal timing diagram 900 for selection of a reference clock signal using an example clock selection system, under an alternative embodiment. The clock selection system used for purposes of this example is configured as described above with reference to FIG. 7 and includes eight (M is 8) mixer circuits (not shown), but is not so limited. Each of the eight mixer circuits outputs a reference clock signal REF<N> (where N is 1, 2, . . . 8) having one of eight different phases. Each mixer circuit also outputs a complement reference clock signal REFb<N>. The different phases of the reference clock signals REF<N> and complement reference clock signals REFb<N> collectively span one cycle or period $t_{cyc}$ of the corresponding data signals with the phases evenly spaced through the cycle $t_{cyc}$ but, as described above, the embodiment is not so limited. When compared to the embodiments described above using mixer circuits that provide only the reference clock signal, use of the complement reference clock signals REFb<N> provides twice the number of sample points through the cycle $t_{cyc}$.

Taking one interface circuit as an example, a memory controller or other component of a host system places one or more components of the clock selection system in a calibration mode. In the calibration mode a known data pattern 902 is provided to the interface circuit via data signals BIT<Y> (from a memory device for example) and the interface circuit in turn initiates dummy reads of the data signals. During the dummy reads, the data signals of the pin/electrical interface BIT<Y> are sampled by the interface circuit using each of the eight reference clock signals REF<N> and eight complement reference clock signals REFb<N>. A comparison is made of the sampled data corresponding to each reference clock signal and the known data pattern 902, as described above with reference to FIG. 5, and a pass/fail determination is made depending on whether each sample point is in the data eye 902 or outside the data eye 902 of the data signal.

Using the pass/fail information, a size of the pass region is determined by comparing the "2*M-to-1" MUX selection value between the first pass condition ("P1" which corresponds to REFb<6>, the $6^{th}$ MUX selection value in this example) and the last pass condition ("P7" which corresponds to REF<4>, the $12^{th}$ MUX selection value in this example). In one embodiment, a numerical average of the first and last pass condition "N" values is performed, yielding an average of 9. Via this example process, the $9^{th}$ MUX selection value (which corresponds to reference clock signal REF<1>) is chosen for the "2*M-to-1" multiplexer MUX<Y> during normal operations Following determination of the optimal reference clock signal (REF<1>) the memory system is placed in an operating mode in which the interface circuit functions as one of an input sampler and a transmit driver. The reference clock signal selected during the calibration process (REF<1>) is subsequently used as a clock input for the interface circuit in data transfers across the associated pin/electrical interface. Use of the selected reference clock signal optimizes the overall timing margin between the data signal and the per-bit sample signal during data transfer operations.

The components of the memory systems described above include any collection of computing components and devices operating together. The components of the memory systems can also be components or subsystems within a larger computer system or network. The memory system components can also be coupled among any number of components (not shown), for example other buses, controllers, memory devices, and data input/output (I/O) devices, in any number of combinations. Many of these system components may be soldered to a common printed circuit board (for example, a graphics card or game console device), or may be integrated in a system that includes several printed circuit boards that are coupled together in a system, for example, using connector and socket interfaces such as those employed by personal computer motherboards and dual inline memory modules ("DIMM"). In other examples, complete systems may be integrated in a single package housing using a system in package ("SIP") type of approach. Integrated circuit devices may be stacked on top of one another and utilize wire bond connections to effectuate communication between chips or may be integrated on a single planar substrate within the package housing.

Further, functions of the memory system components can be distributed among any number/combination of other processor-based components. The memory systems described above include, for example, various dynamic random access memory (DRAM) systems. As examples, the DRAM memory systems can include double data rate ("DDR") systems like DDR SDRAM as well as DDR2 SDRAM and other DDR SDRAM variants, such as Graphics DDR ("GDDR") and further generations of these memory technologies, i.e., GDDR2, and GDDR3, but is not limited to these memory systems.

Aspects of the multiplexer-based clock selection system described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the multiplexer-based clock selection system include: microcontrollers with memory (such as electronically erasable programmable read only memory (EEPROM)), circuit blocks integrated in a system on chip ("SOC") type of integrated circuit implementation, embedded microprocessors, firmware, software, etc. Furthermore, aspects of the multiplexer-based clock selection system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the multiplexer-based clock selection system is not intended to be exhaustive or to limit the system to the precise form disclosed. While specific embodiments of, and examples for, the multiplexer-based clock selection system are described herein for illustrative purposes, various equivalent modifications are possible within the scope of the system, as those skilled in the relevant art will recognize. The teachings of the multiplexer-based clock selection system provided herein can be applied to other circuits or processing systems, not only for the systems and circuits described above.

The elements and acts of the various embodiments described above can be combined to provide further embodiments. These and other changes can be made to the multiplexer-based clock selection system in light of the above detailed description.

In general, in the following claims, the terms used should not be construed to limit the multiplexer-based clock selection system to the specific embodiments disclosed in the specification and the claims, but should be construed to include all processing systems that operate under the claims to provide per-bit clocking. Accordingly, the multiplexer-based clock selection system is not limited by the disclosure, but instead the scope of the system is to be determined entirely by the claims.

While certain aspects of the multiplexer-based clock selection system are presented below in certain claim forms, the inventor contemplates the various aspects of the system in any number of claim forms. For example, while only one aspect of the system is recited as embodied in machine readable media, other aspects may likewise be embodied in machine readable media. Accordingly, the inventor reserves the right to add additional claims after filing the application to pursue such additional claim forms for other aspects of the multiplexer-based clock selection system.

What is claimed is:

1. A method of operating a clock selection system for a plurality of circuit pins, the method comprising:
   placing the clock selection system in a calibration mode;
   providing a known pattern of data signals;
   synthesizing a set of internal clock signals based on at least one first timing signal;
   at each pin, sequentially sampling the data signals with a sampler clocked by the set of internal clock signals, the set of internal clock signals having the same frequency but different phases that collectively span at least a portion of one cycle of a data signal;
   comparing the sampled data to the known pattern of data signals;
   determining pass/fail data samples associated with each of the plurality of clock signals; and
   for each pin, selecting one of the set of internal clock signals for data transfers based on the pass/fail data samples.

2. The method according to claim 1 wherein each data signal exhibits a data eye, and the determining pass/fail data samples is based on whether the sampled data falls inside or outside the data eye for each data signal.

3. The method according to claim 2 and further including determining a pass region size by comparing values of a first pass condition with a last pass condition.

4. The method according to claim 3 wherein the selected one of the clock signals is based on a clock phase approximating a numerical average of the first and last pass condition.

5. The method according to claim 4 wherein the selected one of the clock signals is based on the nearest integer phase clock signal to the numerical average of the first and last pass condition.

6. The method according to claim 1 and further comprising:
   placing the clock selection system in an operating mode; and
   using the selected one of the set of internal clock signals as the clock input for data transfers associated with the pin.

7. The method according to claim 1 wherein the set of internal clock signals include:
   a set of reference clock signals; and
   a set of complement clock signals based on the reference clock signals.

8. The method according to claim 7 wherein each complement clock signal in the set of complement clock signals is the complement of a corresponding one of the reference clock signals.

9. The method according to claim 7 wherein:
   the set of reference clock signals collectively spans a first portion of the cycle of the data signal; and
   the set of complement clock signals collectively spans a second portion of the cycle of the data signal.

10. The method according to claim 1 wherein the set of internal clock signals collectively span one cycle of the corresponding data signals.

11. The method according to claim 1 wherein the set of internal clock signals collectively span half of one cycle of the corresponding data signals.

12. The method according to claim 1 wherein a value corresponding to the selected one of the set of internal clock signals is loaded into a programmable register.

13. The method according to claim 1 wherein the selecting one of the set of internal clock signals comprises multiplexing one from the set of internal clock signals in response to control signals based on the pass/fail data samples.

14. A clock selection system for a plurality of circuit pins, the system comprising:
   means for placing the clock selection system in a calibration mode;
   means for providing a known pattern of data signals;
   means for synthesizing a set of internal clock signals based on at least one first timing signal;
   means for sequentially sampling the data signals with a sampler clocked by the set of internal clock signals for each of a plurality of pins, the set of internal clock signals having the same frequency but different phases that collectively span at least a portion of one cycle of a data signal;
   means for comparing the sampled data to the known pattern of data signals;
   means for determining pass/fail data samples associated with each of the set of internal clock signals; and
   means for selecting one of the set of internal clock signals for data transfers for each of the plurality of pins based on the pass/fail data samples.

15. The clock selection system according to claim 14 wherein the means for selecting one of the of set of internal clock signals comprises per-pin multiplexers.

16. A clock selection circuit comprising:
   clock synthesis circuitry to synthesize a set of internal clock signals based on at least one first timing signal;
   sampler circuitry to sequentially sample a known pattern of data signals arriving at each of a plurality of pins, the sampler circuitry clocked by the set of internal clock signals, the set of internal clock signals having the same frequency but different phases that collectively span at least a portion of one cycle of a data signal;
   comparator circuitry to compare the sampled data produced by the sampler circuitry to the known pattern of data signals and to responsively generate pass/fail data for each of the set of internal clock signals; and selection circuitry to select for each of the plurality of pins one of the set of internal clock signals for data transfers based on the pass/fail data samples.

17. The clock selection circuit according to claim 16 and further comprising:
a programmable register to store the selected clock signal for each of the plurality of pins.

18. The clock selection circuit according to claim 16 wherein the clock selection circuit is disposed on a first integrated circuit chip.

19. The clock selection circuit according to claim 16 wherein the known pattern of data signals is transmitted to said clock selection circuit from a second integrated circuit chip.

20. The method of claim 1 wherein synthesizing includes generating first clock signals and mixing the first clock signals to generate the set of internal clock signals, the set distributed in common to a sampler for each of the plurality of circuit pins.

21. The clock selection system of claim 14 wherein the means for synthesizing includes means for generating first clock signals and means for mixing the first clock signals to generate the set of internal clock signals, the set distributed in common to a sampler for each of the plurality of circuit pins.

22. The clock selection system of claim 21 wherein the means for generating the first clock signals includes means for generating the first clock signals from an externally-supplied timing reference signal.

23. The clock selection system of claim 16 wherein the clock synthesis circuitry includes a clock generator to generate first clock signals and a mixer to mix the first clock signals to generate the set of internal clock signals, the set distributed in common to a sampler for each of the plurality of circuit pins.

24. The clock selection system of claim 1 wherein synthesizing comprises importing an externally supplied reference timing signal as the first timing signal.

25. A method of selecting a clock signal for each one of plural signaling pins of an integrated circuit, the method comprising placing the integrated circuit in a calibration mode and:
synthesizing a set of internal clock signals based on at least one first timing signal, the internal clock signals having the same frequency but different phases collectively spanning at least a portion of one cycle of a data signal;
distributing the set of internal clock signals to each one of the plural signaling pins, each of the internal clock signals individually eligible for selection at each one of the plural signaling pins for use in timing data transfers with an external bus;
at each pin, and for each one of the internal clock signals, comparing sampled data to a known pattern of data signals;
for each pin, determining pass/fail data samples from the comparing for each one of the internal clock signals; and
for each pin, selecting one of the set of internal clock signals based on the pass/fail samples for use in timing the data transfers over the corresponding pin.

26. An integrated circuit device comprising:
signaling pins, each for conveying data transfers between the integrated circuit device and an associated signaling line of an external bus;
clock synthesis circuitry to synthesize internal clock signals based on at least one first timing signal, the internal clock signals each having the same frequency but different respective phases that collectively span at least a portion of one cycle of a data signal;
wherein the internal clock signals are distributed as a set to each of the pins and each of the internal clock signals is individually eligible for selection in timing data transfers for the corresponding pin;
sampler circuitry to sequentially sample data for each of the plural signaling pins;
comparator circuitry to compare the sampled data for each of the plural signaling pins with a known pattern of data signals for each of the internal clock signals and to responsively generate pass/fail data; and
selection circuitry to individually select for each signaling pin one of the internal clock signals for data transfers with the associated signaling line.

27. The integrated circuit device of claim 26 wherein the selection circuitry includes a multiplexer for each signaling pin, each multiplexer receiving each of the internal clock signals as inputs and providing exactly one of the internal clock signals to the sampler circuitry for use as a clock signal to time the sampling of data signals received from the associated signaling line.

28. The integrated circuit device of claim 26 embodied as a discrete random access memory (DRAM) device.

29. The integrated circuit device of claim 26 embodied as a memory controller.

* * * * *